United States Patent
Hawkins (10) Patent No.: US 10,883,717 B2
(45) Date of Patent: Jan. 5, 2021

(54) SOLENOID OPERATED VALVE FOR REDUCING EXCESSIVE PIPING PRESSURE IN A FLUID DISTRIBUTION SYSTEM

(71) Applicant: EMERSON PROCESS MANAGEMENT REGULATOR TECHNOLOGIES, INC., McKinney, TX (US)

(72) Inventor: James C. Hawkins, Allen, TX (US)

(73) Assignee: EMERSON PROCESS MANAGEMENT REGULATOR TECHNOLOGIES, INC., McKinney, TX (US)

(*) Notice: Subject to any disclaimer, the term of this patent is extended or adjusted under 35 U.S.C. 154(b) by 186 days.

(21) Appl. No.: 15/913,610

(22) Filed: Mar. 6, 2018

(65) Prior Publication Data
US 2019/0277496 A1 Sep. 12, 2019

(51) Int. Cl.
*F23K 5/14* (2006.01)
*G05D 16/06* (2006.01)
(Continued)

(52) U.S. Cl.
CPC ............ *F23K 5/147* (2013.01); *F16K 17/048* (2013.01); *F16K 31/0655* (2013.01);
(Continued)

(58) Field of Classification Search
CPC ............... F23K 5/147; F23K 2401/201; F23K 2900/05001; F23K 2900/05002;
(Continued)

(56) References Cited

U.S. PATENT DOCUMENTS

| | | | | |
|---|---|---|---|---|
| 2,821,206 A * | 1/1958 | Holmes | ............... | F16K 31/0655 137/65 |
| 2,938,539 A * | 5/1960 | Holmes | .............. | G05D 16/2086 137/505.42 |
| 3,179,123 A * | 4/1965 | Kowalski | ........... | G05D 16/2022 137/495 |
| 6,293,514 B1 * | 9/2001 | Pechoux | ................... | F16K 1/52 137/625.3 |

(Continued)

FOREIGN PATENT DOCUMENTS

CN 101929574 B 1/2012

OTHER PUBLICATIONS

"CS800 Series Commerical/Industrial Pressure Reducing Regulators", Emerson Process Management, Product Bulletin, Nov. 2014.
(Continued)

*Primary Examiner* — Michael R Reid
(74) *Attorney, Agent, or Firm* — Marshall, Gerstein & Borun LLP (57) ABSTRACT

An assembly for reducing excess piping pressure in a fluid distribution system. The assembly includes a fluid regulator including a body defining an inlet, an outlet, and a fluid passageway between the inlet and the outlet, a first control element movable relative to a valve seat in the fluid passageway to control fluid flow therethrough, a valve stem coupled to the first control element, and an actuator assembly operatively coupled to the valve stem to control a position of the first control element. The assembly also includes a solenoid valve coupled to the fluid regulator at a position upstream of the outlet, the solenoid valve adapted to receive a control signal indicative of zero demand downstream of the fluid regulator, and having a second control element that is movable, responsive to the control signal, from a first position to a second position to reduce fluid flowing through the fluid passageway.

18 Claims, 5 Drawing Sheets

(51) Int. Cl.
*F16K 31/06* (2006.01)
*G05D 16/20* (2006.01)
*F16K 17/04* (2006.01)
*F16K 31/126* (2006.01)
*F23K 5/00* (2006.01)

(52) U.S. Cl.
CPC .......... *F16K 31/1262* (2013.01); *F23K 5/007* (2013.01); *G05D 16/063* (2013.01); *G05D 16/0683* (2013.01); *G05D 16/202* (2013.01); *G05D 16/2086* (2013.01); *F23K 2203/20* (2013.01); *F23K 2400/201* (2020.05); *F23K 2900/05001* (2013.01)

(58) Field of Classification Search
CPC .............. G05D 16/2086; G05D 16/202; F16K 17/048; F16K 11/048; F16K 11/24; F16K 31/0634
See application file for complete search history.

(56) References Cited

U.S. PATENT DOCUMENTS

| | | |
|---|---|---|
| 8,256,446 B2 | 9/2012 | Hawkins et al. |
| 9,810,429 B2* | 11/2017 | Vrolijk .................... F23N 5/107 |
| 2009/0205593 A1* | 8/2009 | Huang .................... F23K 5/002 |
| | | 123/90.11 |
| 2017/0102145 A1 | 4/2017 | Weyer, Jr. et al. |
| 2018/0058596 A1 | 3/2018 | Hawkins et al. |

OTHER PUBLICATIONS

International Search Report and Written Opinion for Application No. PCT/US2019/020181 dated Jun. 27, 2019.
"Solenoid Valves", ASCO Valve, Inc., Product Bulletin, publicly available before Mar. 6, 2018.

* cited by examiner

FIG. 7

SOLENOID OPERATED VALVE FOR REDUCING EXCESSIVE PIPING PRESSURE IN A FLUID DISTRIBUTION SYSTEM

FIELD OF THE DISCLOSURE

The present disclosure is directed to fluid regulators, and, more particularly, to a solenoid valve for reducing excessive piping pressure in a fluid distribution system.

BACKGROUND

The pressure at which a typical fluid distribution system supplies fluid may vary according to the demands placed on the system, the climate, the source of the supply, and/or other factors. However, most end-user facilities equipped with fluid appliances such as, for example, furnaces, burners, ovens, and other fluid appliances, require the fluid to be delivered in accordance with predetermined pressure parameters. Therefore, pressure regulators are commonly employed to control the pressure in the system downstream of the regulator while matching a downstream flow demand.

Fluid regulators such as CS800 Series Regulators are primarily designed for industrial and commercial applications supplying fluids, such as natural gas and propane, to fluid appliances. Fluid regulators are typically used to regulate the pressure of a fluid to a substantially constant value. Specifically, a pressure regulator has an inlet that typically receives a supply fluid at a relatively high pressure and provides a relatively lower and substantially constant pressure at an outlet. To regulate the downstream pressure, pressure regulators commonly include a sensing element or diaphragm to sense an outlet pressure in fluid communication with a downstream pressure.

Figure 1:
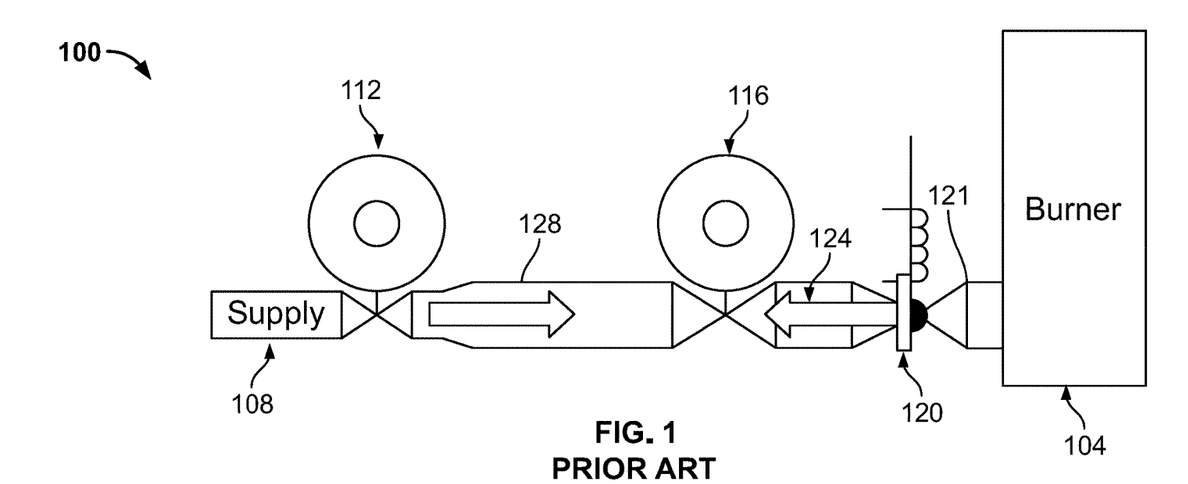
FIG. 1 is a schematic diagram of a known fluid distribution system.

FIG. 1 illustrates one example of a known fluid distribution system 100 primarily designed for supplying regulated natural gas to a burner 104 or other fluid appliance utilized in a boiler application. The fluid distribution system 100 includes a supply 108 of the natural gas, a fluid regulator 112 disposed downstream of the supply 108 but upstream of the burner 104, an appliance regulator 116 disposed between the fluid regulator 112 and the burner 104, and a solenoid shutoff valve 120 that is disposed between the appliance regulator 116 and the burner 104 and is communicatively connected to the burner 104 via wiring 121. As is known in the art, the fluid regulator 112 is configured to regulate the pressure of the natural gas flowing to the burner 104 in accordance with the natural gas demands of the burner 104.

Problems arise in the known fluid distribution system 100 (and other similar known distribution systems) when there is zero demand for the natural gas at the burner 104, which generally occurs when the boiler is between heating cycles. When this happens, the shutoff valve 120 is closed, shutting off the supply of the natural gas to the burner 104 until needed again (i.e., until there is a non-zero demand at the burner 104). However, while the shutoff valve 120 instantaneously halts the supply of the natural gas to the burner 104, the fluid regulator 112 continues to supply gas (i.e., allow fluid flow from the supply 108 to the burner 104) until the fluid regulator 112 receives a pressure signal 124, indicative of the zero demand, from the downstream shutoff valve 112 (e.g., via the sensing element, diaphragm, or other component that senses the downstream pressure) and mechanically responds to the rapid change in gas demand. In many instances, the resulting volume of natural gas entering (via the fluid regulator 112) and flowing through piping 128 between the fluid regulator 112 and the shutoff valve 120 during this response delay far exceeds the amount of pipe volume available, which in turn results in excessive piping pressure.

SUMMARY

In accordance with a first exemplary aspect, an assembly is provided for reducing excess piping pressure in a fluid distribution system. The assembly includes a fluid regulator and a solenoid valve. The fluid regulator includes a regulator body defining a first inlet, a first outlet, and a first fluid passageway between the first inlet and the outlet, a first valve seat disposed in the first fluid passageway, a first control element movable relative to the first valve seat to control fluid flow through the first fluid passageway, a first valve stem coupled to the first control element, and an actuator assembly operatively coupled to the first valve stem to control a position of the first control element. The solenoid valve is coupled to the fluid regulator at a position upstream of the first outlet of the regulator body. The solenoid valve is adapted to receive a control signal indicative of zero demand downstream of the fluid regulator. The solenoid valve has a second control element that is movable, responsive to the control signal, from a first position to a second position to reduce fluid flowing through the first fluid passageway.

In accordance with a second exemplary aspect, a fluid regulator is provided for reducing excess piping pressure in a fluid distribution system. The fluid regulator assembly includes a regulator body defining a first inlet, a first outlet, and a first fluid passageway between the first inlet and the outlet, a first valve seat disposed in the first fluid passageway, a first control element movable relative to the first valve seat to control fluid flow through the first fluid passageway, a first valve stem coupled to the first control element; an actuator assembly operatively coupled to the first valve stem to control a position of the first control element, and a solenoid valve carried by the regulator body at a position between the first inlet and the first outlet. The solenoid valve is adapted to receive a control signal indicative of zero demand downstream of the first outlet. The solenoid valve has a second control element that is movable, responsive to the control signal, between a first position, wherein the second control element is spaced from the first valve seat and substantially outside of the first fluid passageway, and a second position, wherein the second control element engages the first valve seat, such that the second control element reduces fluid flow from the first inlet to the first outlet.

In accordance with a third exemplary aspect, a fluid distribution system is provided. The fluid distribution system includes a supply of fluid, an appliance, and a fluid regulator configured to obtain fluid from the supply of fluid and including a control element that is movable to deliver the fluid to the appliance at a regulated pressure based on a load demand of the appliance. The fluid distribution system also includes a first solenoid valve arranged between the fluid regulator and the appliance, the first solenoid valve configured to move to a closed position, preventing fluid flow from the fluid regulator to the appliance, responsive to a signal received from the appliance indicative of the load demand being equal to zero. The fluid distribution system further includes a second solenoid valve arranged in parallel with the first solenoid valve between the fluid regulator and the appliance, the second solenoid valve configured to limit fluid flow through the fluid regulator responsive to the signal received from the appliance indicative of the load demand being equal to zero.

In further accordance with any one or more of the foregoing first, second, or third exemplary aspects, an assembly, a fluid regulator, and/or a fluid distribution system may include any one or more of the following further preferred forms.

In one preferred form, the solenoid valve further includes a valve body, a second valve stem coupled to the second control element, and a solenoid operatively coupled to the second valve stem to move the second control element between the first position and the second position.

In another preferred form, the valve body of the solenoid valve is at least partially disposed in the regulator body of the fluid regulator, the second valve stem is at least partially disposed in the regulator body of the fluid regulator, and the second control element is movably disposed between the first valve seat and the valve body of the solenoid valve.

In another preferred form, the first valve seat defines a primary seating surface and a secondary seating surface opposite the primary seating surface. The first control element is movable between a closed position, in which the first control element sealingly engages the primary seating surface, and an open position, in which the first control element is spaced from the primary seating surface. When in the first position, the second control element is spaced from the secondary seating surface, and in the second position, the second control element engages the secondary seating surface.

In another preferred form, a plurality of flow openings are formed through the second control element, such that when the second control element is in the second position, the second control element allows a limited fluid flow from the first inlet to the first outlet, thereby reducing a flow capacity of the fluid regulator.

In another preferred form, the solenoid valve is carried by the fluid regulator at a position between the first inlet and the first outlet.

In another preferred form, the solenoid valve is disposed upstream of the first inlet of the regulator body.

In another preferred form, the valve body has a second inlet, a second outlet fluidly coupled to the first inlet of the regulator body, and a second fluid passageway between the second inlet and the second outlet. The solenoid valve further includes a second valve seat disposed in the second fluid passageway, the second control element movable relative to the second valve seat to control fluid flow through the second fluid passageway. The second control element is movable between the first position and the second position to control fluid flow through the second fluid passageway and from the second outlet of the solenoid valve to the first inlet of the regulator body of the fluid regulator.

In another preferred form, the actuator assembly includes an actuator housing and a diaphragm disposed in the actuator housing, the diaphragm configured to sense a pressure at the first outlet.

In another preferred form, the solenoid valve has a valve body that is partially disposed within the regulator body, a second valve stem coupled to the second control element and partially disposed within the regulator body, and a solenoid operatively coupled to the second valve stem to move the second control element between the first position and the second position.

In another preferred form, the fluid regulator includes a regulator body defining a first inlet, a first outlet, and a first fluid passageway between the first inlet and the first outlet. The second solenoid valve is positioned upstream of the first inlet of the fluid regulator.

In another preferred form, the second solenoid valve has a second control element that is movable, responsive to the signal, from a first position to a second position to limit the fluid flow through the fluid regulator.

In another preferred form, the second solenoid valve further includes a valve body, a valve stem coupled to the second control element, and a solenoid operatively coupled to the valve stem to move the second control element between the first position and the second position.

In another preferred form, the valve body has a second inlet, a second outlet fluidly coupled to the first inlet of the regulator body, and a second fluid passageway between the second inlet and the second outlet. The solenoid valve further includes a second valve seat disposed in the second fluid passageway, the second control element movable relative to the second valve seat to control fluid flow through the second fluid passageway. The second control element is movable between the first position and the second position to control fluid flow through the second fluid passageway and from the second outlet of the solenoid valve to the first inlet of the regulator body of the fluid regulator.

DETAILED DESCRIPTION

The present disclosure is directed to a fluid regulator assembly for use in reducing excess piping pressure in a fluid distribution system, and a fluid distributing system including such an assembly. The fluid regulator assembly generally includes a fluid regulator and a solenoid valve that is disposed upstream of at least a portion of the fluid regulator. In some examples, the solenoid valve may be carried by the fluid regulator at a position between an inlet and an outlet of the fluid regulator. In other examples, the solenoid valve may be structurally separate from but coupled to the fluid regulator at a position upstream of the fluid regulator. In all of these examples, when there is zero demand for a fluid (e.g., natural gas) in the fluid distribution system, the solenoid valve acts to reduce the fluid flow supplied by the fluid regulator until a pressure signal indicative of the zero demand reaches the fluid regulator and the fluid regulator mechanically responds to the change in demand. In this manner, the solenoid valve reduces the volume of fluid flowing through the fluid distribution system when zero demand exists, which thereby ensures that the volume of fluid is less than the amount of pipe volume available in the fluid distribution system.

Figure 2:
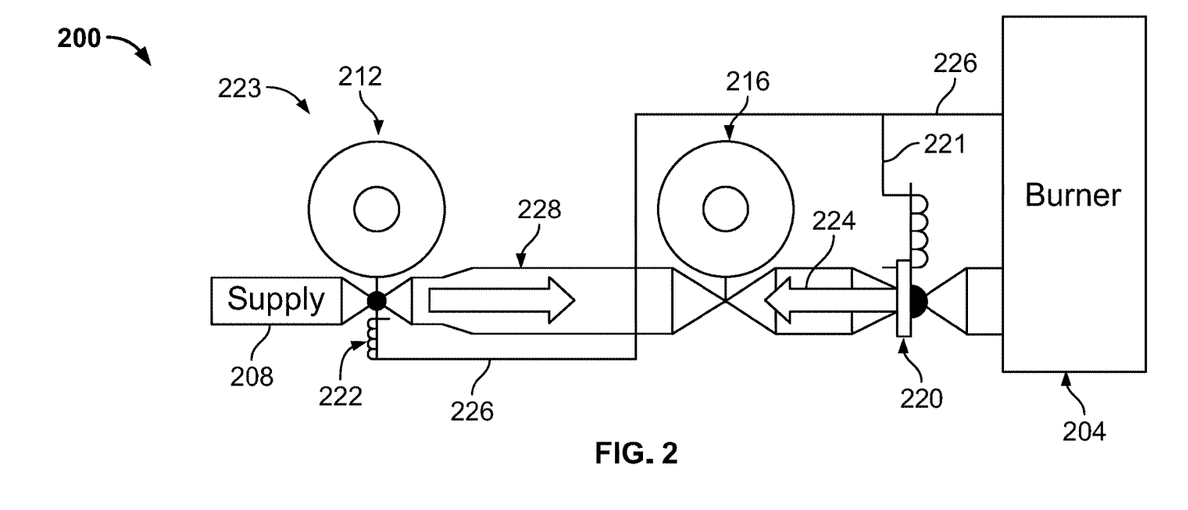
FIG. 2 is a schematic diagram of a first example of a fluid distribution system constructed in accordance with the teachings of the present disclosure, including a unitary fluid regulator assembly having a fluid regulator and a solenoid valve carried by the fluid regulator between an inlet and an outlet of the fluid regulator.

FIG. 2 illustrates a first example of a fluid distribution system 200 constructed in accordance with the present disclosure. Like the fluid distribution system 100, the fluid distribution system 200 is primarily designed for supplying regulated natural gas to a burner 204 or other fluid appliance utilized in a boiler application, though the fluid distribution system 200 can be utilized for other applications as well. The fluid distribution system 200 also includes a supply 208 of the natural gas, a fluid regulator 212 disposed downstream of the supply 208 but upstream of the burner 204, an appliance regulator 216 disposed between the fluid regulator 212, and a solenoid shutoff valve 220 that is disposed between the appliance regulator 216 and the burner 204 and is communicatively connected to the burner 204 via wiring 221. However, in order to address the problems discussed above with respect to the fluid distribution system 100 (and other similar known fluid distribution systems), the fluid distribution system 200 also includes an additional solenoid valve—solenoid valve 222—that is integrally connected to the fluid regulator 212, thereby forming a unitary fluid regulator assembly 223. In some examples, such as the one illustrated in FIG. 2, the solenoid valve 222 is communicatively connected to the burner 204, via wiring 226, in parallel with the shutoff valve 220. Thus, when there is zero demand for the natural gas at the burner 204, e.g., when the boiler is between heating cycles, and the shutoff valve 220 closes responsive to a control signal indicative of the zero demand, shutting off the supply of the natural gas to the burner 104, the solenoid valve 222 simultaneously (or nearly simultaneously) responds to the control signal indicative of the zero demand by reducing the amount of fluid that the fluid regulator 212 continues to supply until the fluid regulator 212 receives pressure signal 224, indicative of the zero demand, from the downstream shutoff valve 220, and mechanically responds to the change in demand. In turn, the solenoid valve 222 ensures that the resulting volume of gas entering and flowing through piping 228 between the fluid regulator 212 and the shutoff valve 220 during this response delay is less than the amount of volume available in the piping 228, thereby preventing the excessive piping pressure that is typically seen in the fluid distribution system 100 and other similar conventional fluid distribution systems.

Figure 3:
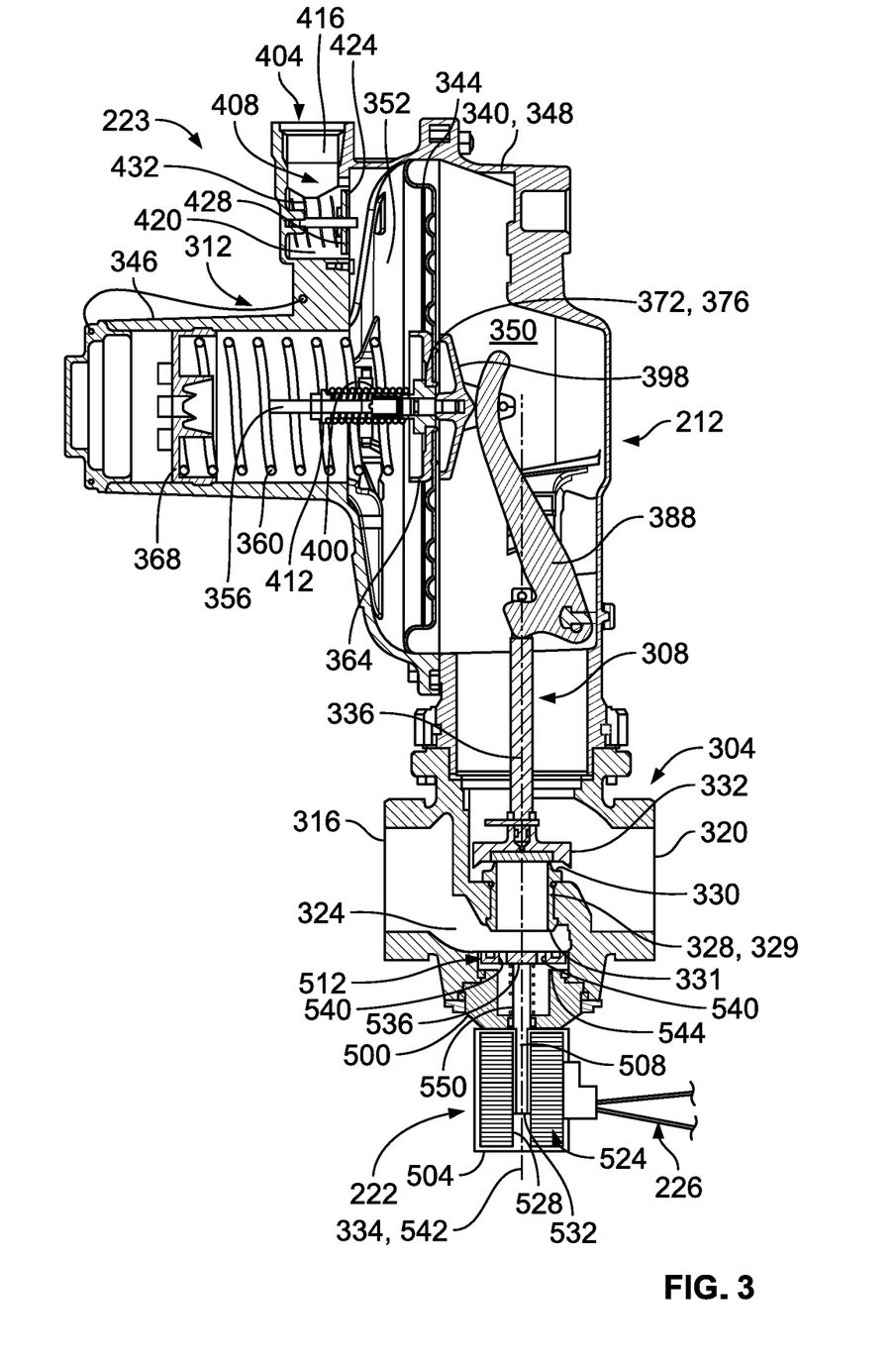
FIG. 3 is a cross-sectional view of the unitary fluid regulator assembly of the fluid distribution system of FIG. 2, showing the solenoid valve in a partially open position.

FIG. 3 illustrates the features of the fluid regulator 212 in greater detail. The fluid regulator 212 in this example generally includes a regulator body 304, a control assembly 308, and an actuator assembly 312. The control assembly 308 is generally configured to control fluid flow through the regulator body 304. The actuator assembly 312 is generally configured to control the control assembly 308, thereby controlling fluid flow through the regulator body 304.

The regulator body 304 defines a fluid inlet 316, a fluid outlet 320, a fluid flow path 324, and an orifice 328. The fluid flow path 324 extends between the fluid inlet 316 and the fluid outlet 320. The orifice 328 is operatively disposed between the fluid inlet 316 and the fluid outlet 320. A valve seat 329 is disposed in the orifice 328 of the regulator body 304. The valve seat 329 may be removably or fixedly disposed in the orifice 328 in any known manner. The valve seat 329 defines a first, or primary, seating surface 330 and a second, or secondary, seating surface 331 opposite the primary seating surface 330. As illustrated, in this example, the primary seating surface 330 is defined between the orifice 328 and the fluid outlet 320, and the secondary seating surface 331 is defined between the fluid inlet 316 and the orifice 328.

The control assembly 308 is disposed for displacement in the regulator body 304 for controlling the flow of fluid therethrough. In this example, the control assembly 308 is disposed for displacement along a longitudinal axis 334. The control assembly 308 includes a control element 332 generally movable along the longitudinal axis 334 and relative to the valve seat 329 (and, more particularly, the primary seating surface 330) to control fluid flow through the fluid flow path 324. The control element 332 illustrated in FIG. 3 takes the form of a valve plug or valve disk, though other control elements 332 may be used. The control assembly 308 also includes a valve stem 336 connected to the control element 332 via any suitable manner in order to control the position of the control element 332 relative to the valve seat 329.

The actuator assembly 312 is operatively connected to the regulator body 304 to control the position of the control element 308 relative to the orifice 328. The actuator assembly 312 includes a housing 340, a diaphragm 344 disposed within the housing 340, and a linkage operatively connecting the diaphragm 344 to the control element 308. The actuator housing 340 is formed of a first or spring case 346 and a second or diaphragm case 348 secured together, such as with one or more bolts connecting respective outer flanges of the first and second cases 346, 348. The diaphragm 344 separates the housing 340 into a first chamber 350 and a second chamber 352. The first chamber 350 is defined at least partly by one side of the diaphragm 344 and the diaphragm case 348. The second chamber 352 is defined at least partly by the other side of the diaphragm 344 and the spring case 346.

The actuator assembly 312 also includes a stem 356, a control spring 360, a first spring seat 364, and a second spring seat 368. The first spring seat 364 guides the stem 356 and is disposed on top of the diaphragm 344 within the second chamber 352 of the actuator housing 340. The first spring seat 364 defines at least one opening 372 that is concentric with an opening 376 formed through a central portion of the diaphragm 344. The first spring seat 364 receives and supports a first end of the control spring 360, as illustrated in FIG. 3. The second spring seat 368, which likewise helps to guide the stem 356 and is disposed within the second chamber 352, receives a second end of the control spring 360 opposite the first end. So arranged, the control spring 360 biases the diaphragm 344 in a direction (a rightward direction in the orientation shown in FIG. 3) against the fluid pressure with a selected force so as to maintain a pressure at the outlet 320 within a pre-selected range. The force exerted by the control spring 360 can be adjusted via, e.g., an adjusting screw, as is known in the art.

The actuator assembly 312 further includes a linkage operatively connecting the diaphragm 344 to the control assembly 308. The linkage includes a lever 388 that has a first end operatively connected to the diaphragm 344 (via the stem 356) and a second end operatively connected to the valve stem 336. Movement of the diaphragm 344 in response to pressure changes at the outlet 320 causes the linkage to shift the control element 308 in a manner so as to maintain the process fluid pressure within the pre-selected range set by the control spring 360.

With the fluid regulator 212 configured as described, the diaphragm-based actuator 312 serves to position the control element 332 relative to the valve seat 329 to satisfy desired process control parameters (e.g., a desired set-point pressure). The control spring 360 of the actuator assembly 312 naturally biases the diaphragm 344 (in a rightward direction when viewed in FIG. 3), which translates into a movement of the control assembly 308 along the longitudinal axis 334 toward an open position, in which the control element 332 is spaced from the primary seating surface 330 of the valve seat 329. In order to move the control assembly 308 toward a closed position, a pneumatic signal can be supplied to the first chamber 350 to increase the pressure in the first chamber 350. The pneumatic signal can, for example, be supplied in response to or based on a pressure at the outlet 320, detected by a feedback pressure sensor, that is less than the desired set-point pressure. In any event, this increase in pressure is sensed by the diaphragm 344 and ultimately overcomes the force applied by the control spring 360, thereby moving the diaphragm 344 in the leftward direction (in the orientation shown in FIG. 3) and moving the lever 388, the valve stem 336 and, in turn, the control element 332 along the longitudinal axis 334 and toward the closed position, in which the control element 332 sealingly engages the primary seating surface 330 of the valve seat 329, as is illustrated in FIG. 3. When the pneumatic signal supplied to the first chamber 350 is reduced and/or eliminated, the spring 360 can expand and urge the diaphragm 344 rightward and, in turn, the lever 388, the valve stem 336, and the control element 332 back toward the open position.

With continued reference to FIG. 3, the fluid regulator 212 also includes over pressure protection, provided, at least in this example, by a pressure relief valve 398, a relief spring 400, an exhaust port 404, and an exhaust valve 408. In the event that an over pressure condition occurs, i.e., the pressure at the outlet 320 rises above a pre-determined threshold pressure set by, for example, the relief spring 400, which typically happens when the fluid regulator 212 or some other component in the system 200 fails, the pressure relief valve 398 and the exhaust valve 408 open to exhaust at least a portion of the fluid to atmosphere via the exhaust port 404, thereby reducing the pressure in the system and protecting equipment downstream of the fluid regulator 212.

The pressure relief valve 398, which in this example takes the form of a pusher post, is arranged in the first chamber 350 and coupled (e.g., threaded) to the stem 356, as illustrated in FIG. 3. The pressure relief valve 398 defines an annular seating surface that selectively engages the diaphragm 344, depending upon the pressure condition, as will be described in greater detail below. The pressure relief valve 398 also receives an end portion of the lever 388, as illustrated in FIG. 3.

The relief spring 400, like the control spring 356, is disposed within the second chamber 352. The relief spring 400 has a first end seated against the first spring seat 364 (which also supports the control spring 360) and a second end seated against a relief spring seat 412 that is coupled to the stem 356. So arranged, the relief spring 400 biases the diaphragm 344 in a direction (leftward, when viewed in FIG. 3) opposite the direction of the biasing force applied by the control spring 360.

The exhaust port 404 is formed or defined in the spring case 346 of the housing 340. The exhaust port 404 is, in this example, an L-shaped cavity including a first or vertical portion 416 and a second or horizontal portion 420. The first portion 416 defines a seating surface 424 and is in selective fluid communication with the second chamber 352, depending upon the position of the exhaust valve 408 relative to the seating surface 424. The second portion 420 is in fluid communication with the first portion 416 and the atmosphere, such that fluid that flows into the first portion 416 from the second chamber 352 can be exhausted to the atmosphere.

The exhaust valve 408 includes a valve plug 428 and a release spring 432, each of which is disposed in the second portion 420 of the exhaust port 404. The valve plug 428 is movable relative to the seating surface 424 to control fluid flow through the exhaust port 404, and, ultimately, to the atmosphere. The release spring 432, meanwhile, is arranged to bias the valve plug 428 into a closed position in sealing engagement with the seating surface 424.

In normal operation, the seating surface of the pressure relief valve 398 sealingly engages the diaphragm 344, thereby preventing fluid communication between the first and second chambers 350, 352. However, in the event that the pressure at the outlet 320 rises above the pre-determined pressure, thereby indicating the existence of an overpressure condition, the pressure forces the diaphragm 344 and the first spring seat 364 leftward (in the orientation shown in FIG. 3), thereby compressing the relief spring 400 against the relief spring seat 412. This, in turn, disengages the seating surface of the pressure relief valve 398 from the diaphragm 344, which allows fluid to flow through the openings 372, 376 and into the second chamber 352. As the second chamber 352 is filled with fluid, the pressure within the second chamber 352 increases. At some point, the pressure within the second chamber 352 rises above a predetermined release pressure, which is set by the release spring 432, driving the valve plug 428 leftward, away from the seating surface 424, and allowing fluid from the second chamber 352 to be exhausted to atmosphere via the exhaust port 404.

As generally discussed above, the solenoid valve 222 is integrally connected to the fluid regulator 212 so as to form the unitary fluid regulator assembly 223. In this example, the solenoid valve 222 is integrally connected to the regulator body 304 at a position between the fluid inlet 316 and the fluid outlet 320 (i.e., downstream of the inlet 316 and upstream of the outlet 320), such that the solenoid valve 222 is carried by the regulator body 304. In other examples, however, the solenoid valve 222 may be integrally connected to the regulator body 304 in a different manner (e.g., in a different location) or may be removably connected to the regulator body 304.

Figure 3A:
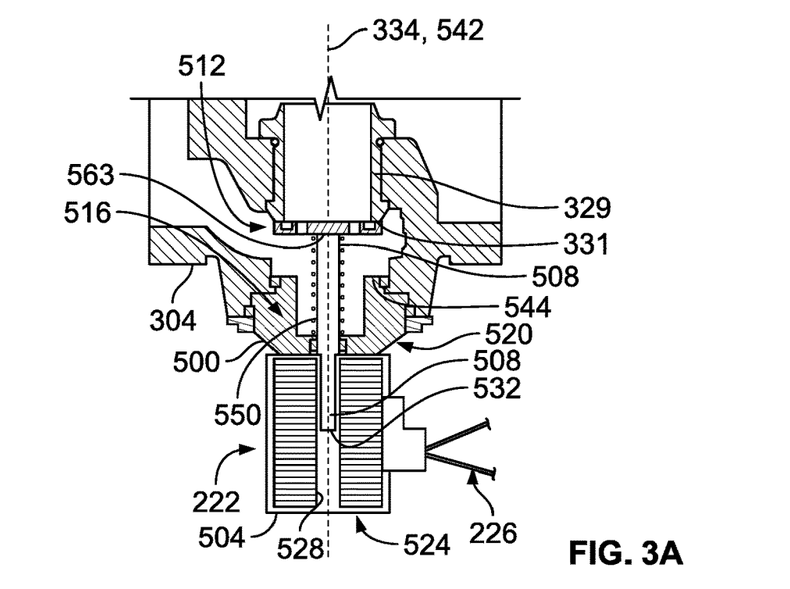
FIG. 3A is a close-up view of a portion of the unitary fluid regulator assembly of FIG. 3, but showing the solenoid valve in a closed position that reduces excess piping pressure in the fluid distribution system.
Figure 4:
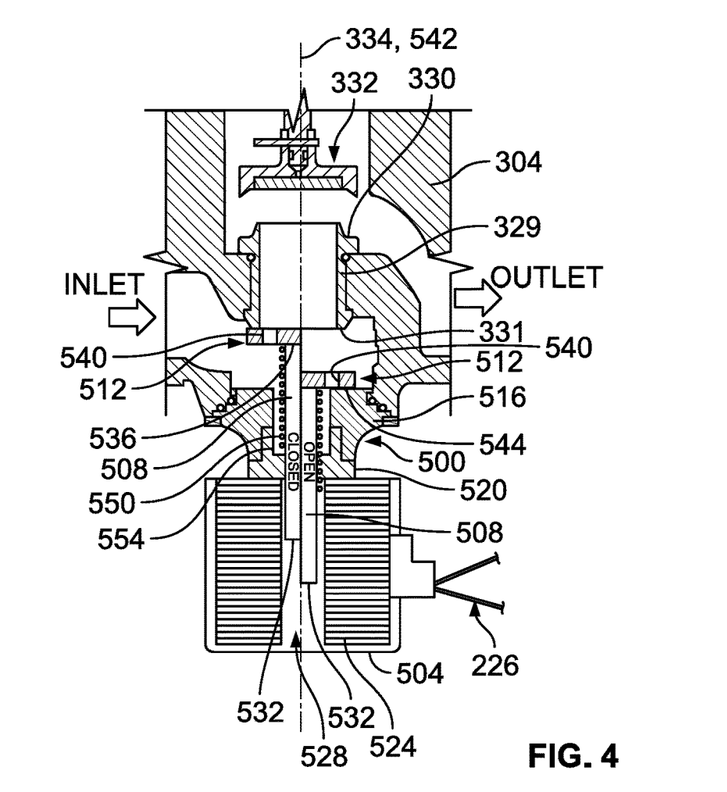
FIG. 4 is a close-up view of a portion of the unitary fluid regulator assembly of FIG. 3, showing the solenoid valve in both the closed position and a fully open position.

As best illustrated in FIGS. 3, 3A, and 4, the solenoid valve 222 in this example includes a valve body 500, a solenoid 504, a valve stem 508, and a control element 512 that is coupled to the valve stem 508 and is independent of the control element 332. The valve body 500 has a generally annular shape, though it will be appreciated that the exact shape can vary. The valve body 500 in this example is sized such that when the solenoid valve 222 is integrally connected to the fluid regulator 212, a first portion 516 of the valve body 500 is disposed in and sealingly engages a portion of the regulator body 304, and a second portion 520 of the valve body 500 is disposed outside of the regulator body 304. The solenoid 504 extends outward from the valve body 500 (i.e., away from the regulator body 304), such that the solenoid 504 is also disposed outside of the regulator body 304. The solenoid 504 is connected to the burner 204 via the wiring 226 and includes coil winding 524 and an orifice 528 defined between the coil winding 524.

The valve stem 508 is generally movable along an axis 542 that is co-axial with the longitudinal axis 334. In particular, the valve stem 508 has a first end 532 that is movably disposed in the orifice 528, responsive to energization or de-energization of the coil winding 524 via the wiring 226, and a second end 536, opposite the first end 532, that is movably disposed in the regulator body 304 between the second portion 520 of the valve body 500 and the valve seat 329. The control element 512 in this example takes the form of a valve disk that is carried by the valve stem 508 (at the second end 536) and has a plurality of flow openings 540 defined therethrough. In other examples, however, the control element 512 may instead take the form of a solid valve disk (i.e., it may not include the openings 540), a different control element (e.g., a valve plug), and/or may be coupled to the valve stem 508 in a different manner (e.g., in a different location).

Because the control element 512 is carried by the valve stem 508, the control element 512 is also movable, responsive to the energization or de-energization of the coil winding 524, along the axis 542. The control element 512 is movable, relative to the secondary seating surface 331 of the valve seat 329, along the axis 542 to control fluid flow through the secondary seating surface 331. In particular, the control element 512 is movable between a first, fully open position, in which the control element 512 is seated against a seating surface 544 of the valve body 500 and is spaced from the secondary seating surface 331 (see FIG. 4), and a second, closed position, in which the control element 512 is spaced from the seating surface 544 and engages the secondary seating surface 331 (see FIGS. 3A and 4). The control element 512 may also be positioned in any number of partially open positions between the first and second positions, such as the third, partially open position illustrated in FIG. 3.

It will be appreciated that when the control element 512 is in its first position, the control element 512 is substantially (if not entirely) outside of the fluid flow path 324, and fluid can flow from the inlet 316 to the primary seating surface 330 without obstruction from the control element 512 (or any other portion of the solenoid valve 500). Conversely, when the control element 512 is in its second position, the control element 512 is arranged within the fluid flow path 324, and fluid can only flow from the inlet 316 to the primary seating surface 330 by flowing through the openings 540, which thereby serves to restrict fluid flow from the inlet 316 to the primary seating surface 330 (and to the outlet 320). It will also be appreciated that in examples in which the control element 512 is a solid disk (i.e., does not include flow openings 540), fluid cannot flow from the inlet 316 to the primary seating surface 300 (and to the outlet 320) when the control element 512 is in its second position, thereby completely restricting fluid flow from the inlet 316 to the primary seating surface 330 (and to the outlet 320).

In this example, the solenoid valve 222 also includes a biasing element 550 that is arranged within the regulator body 304 and the valve body 500 to bias the control element 512 to its second, closed position. To this end, the biasing element 550 takes the form of an expansion spring positioned along the valve stem 508 and within a cavity 554 of the valve body 500, such that the expansion spring is arranged between a portion of the valve body 500 and the control element 512. In other examples, however, the biasing element 550 may instead take the form of a compression spring that is arranged to bias the control element 512 to its first position, or some other biasing element.

As discussed above, the solenoid valve 222 is communicatively connected to the burner 204 via wiring 226, such that the solenoid valve 222 is arranged to receive a control signal from the wiring 226. Thus, when there is zero demand for natural gas at the burner 204 during operation of the fluid distribution system 200, the burner 204 generates a control signal indicative of the zero demand and transmits that control signal to both the shutoff valve 220 (via the wiring 221) and the solenoid valve 222 (via the wiring 226). In this example, when there is zero demand for the natural gas at the burner 204, the burner 204 generates, and the solenoid valve 222 receives from the burner 204, a control signal in the form of an absence of electrical current (i.e., the burner 204 stops providing electrical current to the solenoid valve 222), which serves to de-energize the coil winding 524. In other examples, however, when there is zero demand for the natural gas as the burner 204, the control signal may instead take the form of an electrical current, which may serve to energize the coil winding 524 (which, in these other examples, is de-energized so long as there is non-zero demand for gas at the burner 204). Moreover, in other examples, the burner 204 may generate two control signals indicative of the zero demand, one control signal for each of the shutoff valve 220 and the solenoid valve 222, and transmit those control signals to the shutoff valve 220 and the solenoid valve 222.

Responsive to the control signal indicative of the zero demand, the shutoff valve 220 closes, preventing any additional gas from flowing to the burner 204 therethrough, and the solenoid valve 222 operates to reduce the gas that can be supplied by the fluid regulator 212 (i.e., flowing through and out of the fluid regulator 212) until the fluid regulator 212 receives the pressure signal 224 from the shutoff valve 220. In other words, the solenoid valve 222 operates to reduce the flow capacity of the fluid regulator 212 until the fluid regulator 212 receives the pressure signal 224 from the shutoff valve 220.

More particularly, the absence of electrical current received by the solenoid valve 222 via the wiring 226 de-energizes the coil winding 524, which causes the valve stem 508 and the control element 512 to move from the first, fully open position shown in FIG. 4 to the second, closed position also shown in FIG. 4. This, in turn, positions the control element 512 within the fluid flow path 324 and against the secondary seating surface 331, such that fluid can only flow from the inlet 316 to the primary seating surface 330 (and the outlet 320) via the openings 540, thereby restricting fluid flow between the inlet 316 and the outlet 320. Thus, although the fluid regulator 212 continues to supply gas to the downstream piping 228 until the fluid regulator 212 receives the pressure signal 224, the solenoid valve 222 ensures that the fluid regulator 212 only supplies a limited amount of fluid during that time. Importantly, the solenoid valve 222 ensures that the volume of gas that is supplied by the fluid regulator 212 and flows through the piping 228 between the fluid regulator 212 and the shutoff valve is less than the amount of volume available in the piping 228, as is desired to prevent excess pressure build up in the piping 228.

At the same time, when the burner 204 again needs gas (i.e., there is a non-zero demand for gas), the solenoid valve 222 responds in a manner that allows the fluid regulator 212 to meet this non-zero demand. More particularly, when the burner 204 again needs gas, the burner 204 generates a control signal indicative of the non-zero demand and transmits that control signal to both the shutoff valve 220 (via the wiring 221) and the solenoid valve 222 (via the wiring 226). In this example, when there is non-zero demand for the natural gas at the burner 204, the burner 204 provides electrical current to the shutoff valve 220 and the solenoid valve 222, which serves to energize the coil winding 524. In other examples, however, when there is non-zero demand for the natural gas at the burner 204, the burner 204 may stop providing electrical current (or provide another control signal indicative of the non-zero demand) to the shutoff valve 220 and the solenoid valve 222, thereby de-energizing the coil winding 524 when there is non-zero demand. Moreover, in other examples, the burner 204 may generate two control signals indicative of the non-zero demand, one control signal for each of the shutoff valve 220 and the solenoid valve 222, and transmit those control signals to the shutoff valve 220 and the solenoid valve 222. In any case, responsive to the electrical current (or any other control signal indicative of the non-zero demand), the shutoff valve 220 opens, allowing gas to flow from the fluid regulator 212 to the burner 204 therethrough, and the solenoid valve 222 moves from the second, closed position to the first, fully open position. This, in turn, positions the control element 512 substantially outside of the fluid flow path 324, such that the fluid regulator 212 can again supply fluid, without restriction from the solenoid valve 222, to the burner 204 via the piping 228.

Figure 5:
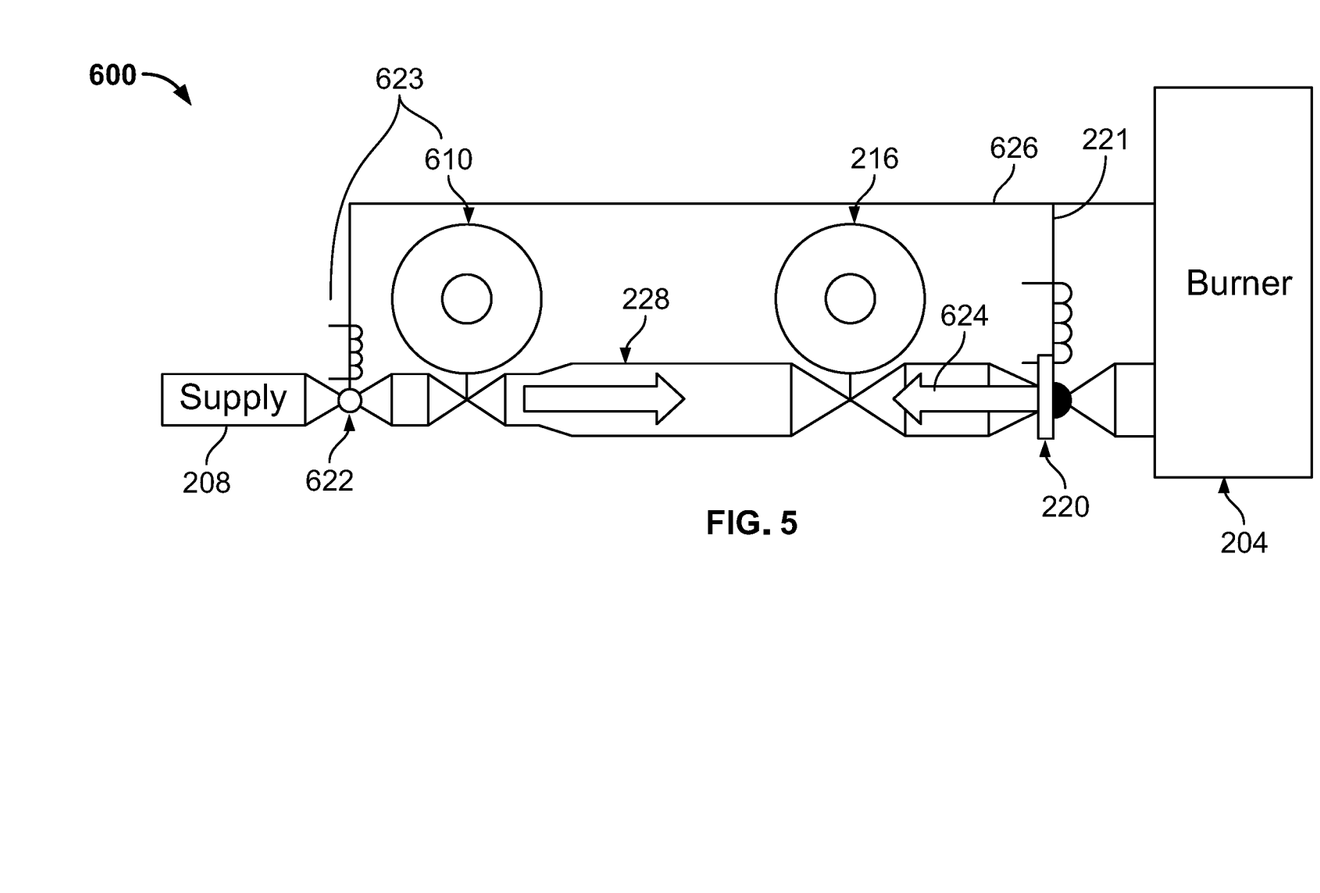
FIG. 5 is a schematic diagram of a second example of a fluid distribution system constructed in accordance with the teachings of the present disclosure, including a two-piece fluid regulator assembly having a fluid regulator and a solenoid valve that is disposed upstream of the fluid regulator.

FIG. 5 illustrates a second example of a fluid distribution system 600 constructed in accordance with the present disclosure. Like the fluid distribution system 200, the fluid distribution system 600 is primarily designed for supplying regulated natural gas to the burner 204 or other fluid appliance utilized in a boiler application, though the fluid distribution system 600 can be utilized to supply fluid in other applications as well. Additionally, like the fluid distribution system 200, the fluid distribution system 600 includes the supply 208, the appliance regulator 216, and the shutoff valve 220. However, unlike the fluid distribution system 200, wherein the solenoid valve 222 is integrally connected with the fluid regulator 212, the fluid distribution system 600 includes a fluid regulator 610 and a solenoid valve 622 that are structurally separate from one another, thereby forming a two-piece fluid regulator assembly 623. More particularly, the solenoid valve 622 is fluidly coupled to but positioned upstream of the fluid regulator 610 (which is otherwise identical to the fluid regulator 212), such that the solenoid valve 622 is positioned between the supply 208 and the fluid regulator 610. As with the solenoid valve 222, the solenoid valve 622 is communicatively connected to the burner 204, via wiring 626, in parallel with the shutoff valve 220.

Figure 6:
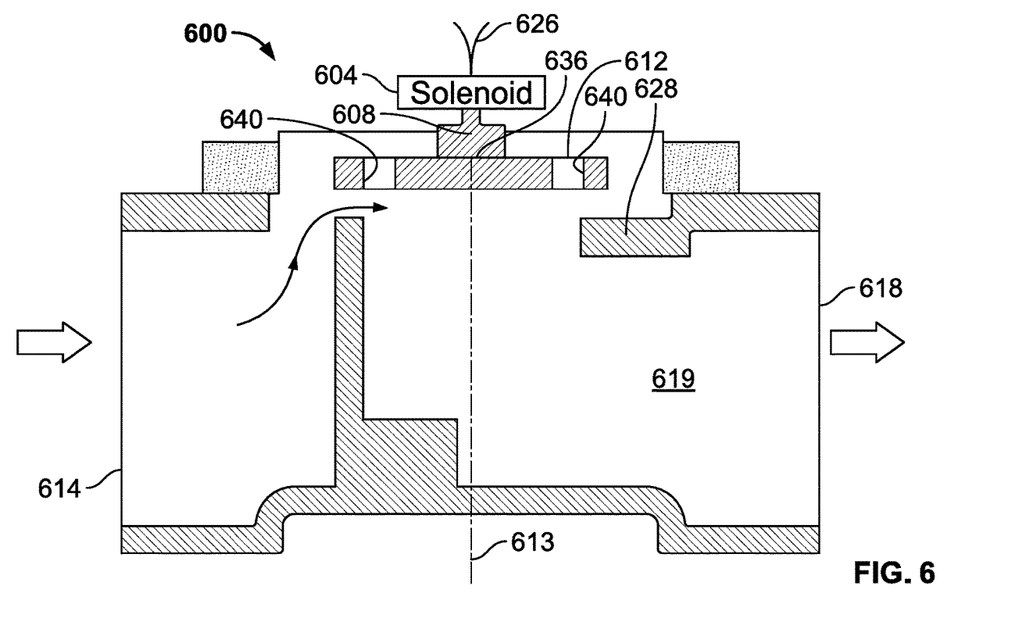
FIG. 6 is a cross-sectional view of the solenoid valve of the fluid distribution system of FIG. 5, showing the solenoid valve in an open position.
Figure 7:
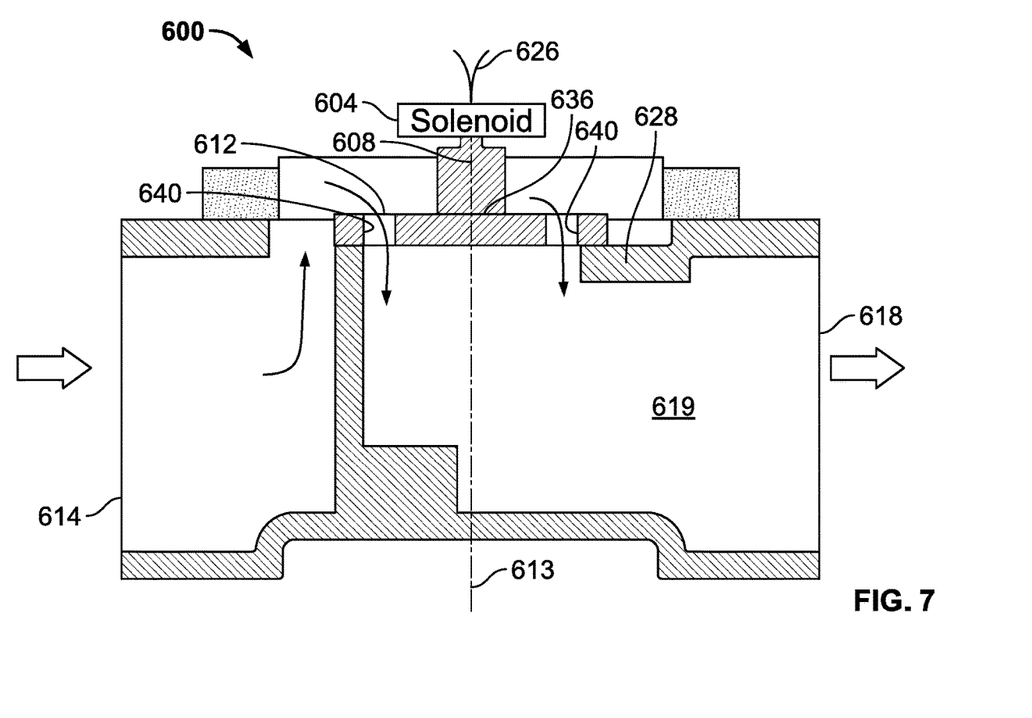
FIG. 7 is similar to FIG. 6, but shows the solenoid valve in a closed position that reduces excess piping pressure in the fluid distribution system.

As best illustrated in FIGS. 6 and 7, the solenoid valve 622 in this example includes a valve body 600 and a solenoid 604. The valve body 600 has a generally annular shape and includes a fluid inlet 614, a fluid outlet 618, and a fluid passageway 619 extending between the inlet 614 and the outlet 618. It will be appreciated that when the solenoid valve 622 is coupled to the fluid regulator 610, the fluid outlet 618 of the solenoid valve 622 may be directly or indirectly fluidly coupled to the fluid inlet of the fluid regulator 610. The valve body 600 in this example also defines a valve seat 628 formed within the fluid passageway 619. In other examples, the valve seat 628 may instead be separately formed and fixedly or removably disposed in the fluid passageway 619. The solenoid 604 extends outward from the valve body 600, such that the solenoid 604 is disposed outside of the valve body 600. The solenoid 604 is connected to the burner 204 via the wiring 626. While not illustrated herein, it will be appreciated that the solenoid 604 includes coil winding (e.g., the coil winding 524) and an orifice (e.g., the orifice 528) defined between the coil winding.

The solenoid valve 622 in this example also includes a valve stem 608 and a control element 612 coupled to the valve stem 608. The valve stem 608 is generally movable along a longitudinal axis 613 that is offset from but parallel to a longitudinal axis of the fluid regulator 610 along which the control element of the fluid regulator 610 moves (not shown, but similar to axis 334 described above). In particular, the valve stem 608 has a first end (not shown) that is movably disposed in the orifice of the solenoid 604, responsive to energization or de-energization of the coil winding via the wiring 626, and a second end 636, opposite the first end, that is movably disposed in the valve body 600 relative to the valve seat 628. The control element 612 in this example takes the form of a valve disk that is carried by the valve stem 608 (at the second end 636) and has a plurality of flow openings 640 defined therethrough. In other examples, however, the control element 612 may instead take the form of a solid valve disk (i.e., it may not include the openings 640), a different control element (e.g., a valve plug), and/or may be coupled to the valve stem 608 in a different manner (e.g., at a different location).

Because the control element 612 is carried by the valve stem 608, the control element 612 is also movable, responsive to the energization or de-energization of the coil winding of the solenoid 604, along the longitudinal axis 613. The control element 612 is movable, relative to the valve seat 628, along the longitudinal axis 613 to control fluid flow through the fluid passageway 619. In particular, the control element 612 is movable between a first, fully open position, in which the control element 612 is spaced from the valve seat 628 (see FIG. 6), and a second, closed position, in which the control element 612 engages the valve seat 628 (see FIG. 7). It will be appreciated that when the control element 612 is in its first position, the control element 612 is substantially (if not entirely) outside of the fluid passageway 619, such that fluid flows through the solenoid valve 622 and, thus, from the supply 208 to the fluid regulator 610 without restriction from the solenoid valve 622. Conversely, when the control element 612 is in its second position, the control element 612 is arranged within the fluid passageway 619, and fluid can only flow from the inlet 614 to the outlet 618 by flowing through the openings 640, which thereby serves to restrict fluid flow through the solenoid valve 622 and, thus, from the supply 208 to the fluid regulator 610. It will also be appreciated that in examples in which the control element 612 is a solid disk (i.e., does not include flow openings 640), fluid cannot flow through the solenoid valve 622 when the control element 612 is in its second position.

Despite the structural differences between the solenoid valve 612 and the solenoid valve 222, the solenoid valve 612 is operationally similar to the solenoid valve 212. Thus, when there is zero demand for the natural gas at the burner 204, e.g., when the boiler is between heating cycles, and the shutoff valve 220 closes responsive to a control signal from the burner 204 indicative of the zero demand, shutting off the supply of the natural gas to the burner 204, the solenoid valve 622 simultaneously (or nearly simultaneously) responds to the control signal by reducing the amount of fluid that the fluid regulator 610 continues to supply until the fluid regulator 610 receives a pressure signal 624, indicative of the zero demand, from the downstream shutoff valve 220 and mechanically responds to the change in demand. More particularly, the solenoid valve 622 responds to the control signal, which energizes or de-energizes the coil winding of the solenoid 604, by moving from the first, open position shown in FIG. 6 to the second, closed position shown in FIG. 7, which, as discussed above, restricts fluid flow through the solenoid valve 622 and, thus, from the supply 208 to the fluid regulator 610 (because the solenoid valve 622 is disposed therebetween).

Finally, it will be appreciated that while the fluid regulator assembly 223 is described in connection with the fluid distribution system 200, and the fluid regulator assembly 623 described in connection with the fluid distribution system 600, the fluid regulator assembly 223 and the fluid regulator assembly 623 can be utilized in any number of different fluid distribution systems. Further, it will be appreciated that the examples described may be implemented in combination with an increase in the length of the piping 228 and/or an increase in the response time of the fluid regulator 212, 612 in order to further reduce excessive piping pressure in a fluid distribution system.

The invention claimed is:

1. An assembly for reducing excess piping pressure in a fluid distribution system, the assembly comprising:
   a fluid regulator, comprising:
      a regulator body defining a first inlet, a first outlet, and a first fluid passageway between the first inlet and the outlet;
      a first valve seat disposed in an orifice of the regulator body within the first fluid passageway, wherein the first valve seat defines on one axial facing surface and a secondary seating surface on the opposite axial facing surface of the first valve seat;
      a first control element movable relative to the first valve seat to control fluid flow through the first fluid passageway;
      a first valve stem coupled to the first control element; and
      an actuator assembly operatively coupled to the first valve stem to control a position of the first control element; and
   a solenoid valve coupled to the fluid regulator at a position upstream of the first outlet of the regulator body, the solenoid valve adapted to receive a control signal indicative of zero demand downstream of the fluid regulator, the solenoid valve having a second control element that is movable, responsive to the control signal, from a first position to a second position to reduce fluid flowing through the first fluid passageway,
   wherein wherein the first control element selectively sealingly engages the primary seating surface and the second control element selectively sealingly engages the secondary seating surface.

2. The assembly of claim 1, wherein the solenoid valve further comprises a valve body, a second valve stem coupled to the second control element, and a solenoid operatively coupled to the second valve stem to move the second control element between the first position and the second position.

3. The assembly of claim 2, wherein the valve body of the solenoid valve is at least partially disposed in the regulator body of the fluid regulator, the second valve stem is at least partially disposed in the regulator body of the fluid regulator, and the second control element is movably disposed between the first valve seat and the valve body of the solenoid valve.

4. The assembly of claim 1, wherein the first control element is movable between a closed position, in which the first control element sealingly engages the primary seating surface, and an open position, in which the first control element is spaced from the primary seating surface, wherein in the first position, the second control element is spaced from the secondary seating surface, and in the second position, the second control element sealingly engages the secondary seating surface.

5. The assembly of claim 1, further comprising a plurality of flow openings formed through the second control element, such that when the second control element is in the second position, the second control element allows a limited fluid flow from the first inlet to the first outlet, thereby reducing a flow capacity of the fluid regulator.

6. The assembly of claim 1, wherein the solenoid valve is carried by the fluid regulator at a position between the first inlet and the first outlet.

7. The assembly of claim 1, wherein the actuator assembly comprises:
   an actuator housing; and a diaphragm disposed in the actuator housing, the diaphragm configured to sense a pressure at the first outlet.

8. The assembly of claim 1, wherein the first control element is disposed outside of the orifice of the regulator body.

9. A fluid regulator for reducing excess piping pressure in a fluid distribution system, the fluid regulator comprising:
   a regulator body defining a first inlet, a first outlet, and a first fluid passageway between the first inlet and the outlet;
   a first valve seat disposed in an orifice of the regulator body within the first fluid passageway, wherein the first valve seat defines a primary seating surface and a secondary seating surface, the primary seating surface defined between the orifice and the fluid outlet, and the secondary seating surface defined between the fluid inlet and the orifice;
   a first control element movable relative to the first valve seat to control fluid flow through the first fluid passageway;
   a first valve stem coupled to the first control element;
   an actuator assembly operatively coupled to the first valve stem to control a position of the first control element; and
   a solenoid valve carried by the regulator body, the solenoid valve adapted to receive a control signal indicative of zero demand downstream of the first outlet, the solenoid valve having a second control element that is movable, responsive to the control signal, between a first position, wherein the second control element is spaced from the secondary seating surface of the first valve seat and substantially outside of the first fluid passageway, and a second position, wherein the second control element engages the secondary seating surface of the first valve seat, such that the second control element reduces fluid flow from the first inlet to the first outlet.

10. The fluid regulator of claim 9, wherein the solenoid valve has a valve body that is partially disposed within the regulator body, a second valve stem coupled to the second control element and partially disposed within the regulator body, and a solenoid operatively coupled to the second valve stem to move the second control element between the first position and the second position.

11. The fluid regulator of claim 9, further comprising a plurality of fluid openings formed through the second control element, such that when the second control element is in the second position, the second control element allows a limited fluid flow from the first inlet to the first outlet, thereby reducing a flow capacity of the fluid regulator.

12. The fluid regulator of claim 9, wherein the secondary seating surface is opposite the primary seating surface, and wherein the first control element is movable between a closed position, in which the first control element sealingly engages the primary seating surface, and an open position, in which the first control element is spaced from the primary seating surface.

13. A fluid distribution system, comprising:
   a supply of fluid;
   an appliance;
   the fluid regulator of claim 10, the fluid regulator configured to obtain fluid from the supply of fluid, wherein the first control element is movable relative to the first valve seat to deliver the fluid to the appliance at a regulated pressure based on a load demand of the appliance; and
   a first solenoid valve arranged between the fluid regulator and the appliance, the first solenoid valve configured to move to a closed position, preventing fluid flow from the fluid regulator to the appliance, responsive to a control signal received from the appliance indicative of the load demand being equal to zero;
   wherein the solenoid valve of the fluid regulator of claim 10 is a second solenoid valve arranged in parallel with the first solenoid valve between the fluid regulator and the appliance, the second solenoid valve configured to limit fluid flow through the fluid regulator responsive to the control signal received from the appliance indicative of the load demand being equal to zero.

14. The fluid distribution system of claim 13, wherein the second solenoid valve is positioned upstream of the first outlet of the fluid regulator.

15. The fluid distribution system of claim 14, wherein the second solenoid valve is carried by the fluid regulator at a position between the first inlet and the first outlet.

16. The fluid distribution system of claim 13, wherein the second solenoid valve further comprises a valve body, a valve stem coupled to the second control element, and a solenoid operatively coupled to the valve stem to move the second control element between the first position and the second position.

17. The fluid distribution system of claim 13, wherein the first control element is movable between a closed position, in which the first control element sealingly engages the primary seating surface, and an open position, in which the first control element is spaced from the primary seating surface.

18. The fluid regulator of claim 9, wherein the solenoid valve is carried by the regulator body at a position between the first inlet and the first outlet.

* * * * *

UNITED STATES PATENT AND TRADEMARK OFFICE
CERTIFICATE OF CORRECTION

PATENT NO. : 10,883,717 B2
APPLICATION NO. : 15/913610
DATED : January 5, 2021
INVENTOR(S) : James C. Hawkins Page 1 of 1

It is certified that error appears in the above-identified patent and that said Letters Patent is hereby corrected as shown below:

In the Specification

At Column 6, Line 31, "element 308" should be -- assembly 308 --.

At Column 6, Line 34, "element 308." should be -- assembly 308. --.

At Column 7, Line 4, "element 308" should be -- assembly 308 --.

At Column 9, Line 45, "500)." should be -- 222). --.

At Column 11, Line 54, "valve body 600" should be -- valve body --.

At Column 11, Line 55, "valve body 600" should be -- valve body --.

At Column 11, Line 62, "valve body 600" should be -- valve body --.

At Column 11, Line 67, "valve body 600" should be -- valve body --.

At Column 12, Line 1, "valve body 600" should be -- valve body --.

At Column 12, Line 18, "valve body 600" should be -- valve body --.

At Column 12, Line 56, "612" should be -- 622 --.

At Column 12, Line 56, "612" should be -- 622 --.

In the Claims

At Column 13, Line 50, "wherein wherein the" should be -- wherein the --.

Signed and Sealed this
Second Day of November, 2021

Drew Hirshfeld
*Performing the Functions and Duties of the*
*Under Secretary of Commerce for Intellectual Property and*
*Director of the United States Patent and Trademark Office*